United States Patent
Ellis et al.

(10) Patent No.: US 11,805,933 B2
(45) Date of Patent: Nov. 7, 2023

(54) COLD BREW COFFEE APPARATUS

(71) Applicant: National Presto Industries, Inc., Eau Claire, WI (US)

(72) Inventors: Brent T Ellis, Eau Claire, WI (US); Aaron J Munsinger, Eau Claire, WI (US); Michael R Berge, Eau Claire, WI (US)

(73) Assignee: National Presto Industries, Inc., Eau Claire, WI (US)

(*) Notice: Subject to any disclaimer, the term of this patent is extended or adjusted under 35 U.S.C. 154(b) by 577 days.

(21) Appl. No.: 17/004,887

(22) Filed: Aug. 27, 2020

(65) Prior Publication Data

US 2021/0059463 A1   Mar. 4, 2021

Related U.S. Application Data

(60) Provisional application No. 62/892,929, filed on Aug. 28, 2019.

(51) Int. Cl.
*A47J 31/02* (2006.01)
*A47J 31/40* (2006.01)
*A47J 31/06* (2006.01)

(52) U.S. Cl.
CPC ........... *A47J 31/02* (2013.01); *A47J 31/0636* (2013.01); *A47J 31/40* (2013.01)

(58) Field of Classification Search
CPC ......... A47J 31/02; A47J 31/0636; A47J 31/40
USPC .......................................................... 99/279
See application file for complete search history.

(56) References Cited

U.S. PATENT DOCUMENTS

| | | | | |
|---|---|---|---|---|
| 2,350,534 A | * | 6/1944 | Rosinger | A47J 43/0465 |
| | | | | 310/104 |
| 4,162,855 A | * | 7/1979 | Bender | A47J 43/0465 |
| | | | | 366/274 |
| 5,586,823 A | * | 12/1996 | Carr | B01F 33/452 |
| | | | | 366/274 |
| 8,282,267 B2 | * | 10/2012 | Castillo | B01F 27/8111 |
| | | | | 366/264 |
| 9,179,798 B2 | * | 11/2015 | Albanese | A47J 31/20 |
| 9,492,027 B2 | | 11/2016 | Morse | |
| 9,526,369 B2 | | 12/2016 | Valasquez | |
| 10,575,672 B2 | * | 3/2020 | Rivera | A47J 31/0636 |
| 10,729,153 B2 | * | 8/2020 | Jacobs | A47J 31/0689 |
| 11,000,145 B2 | * | 5/2021 | Ballezzi | A47J 31/002 |

(Continued)

*Primary Examiner* — Omar Flores Sanchez
(74) *Attorney, Agent, or Firm* — Kenneth A. Smith

(57) ABSTRACT

Disclosed is a cold brew coffee maker and related methods of making cold brew coffee. The cold brew coffee maker can include a rotation plate assembly, a removable cup, a brew chamber and a filtration assembly. The rotation plate assembly can include an internal magnetic component for generating rotational movement of a selectively attachable component of the cup. The removable cup can include a detachable impeller and removable plate. In other embodiments, the impeller may be non-removably affixed to the cup. The impeller can engage with the rotation plate assembly by a magnetic connection. In the "on" mode, the impeller engages with the rotational plate assembly and internal magnetic component, allowing for rotational movement of the impeller. In the "off" mode, the impeller and magnetic component are freely moveable and able to disengage, allowing for easy separation of all assembly components for cleaning or replacement.

17 Claims, 19 Drawing Sheets

(56) References Cited

U.S. PATENT DOCUMENTS

| | | | |
|---|---|---|---|
| 11,064,836 B2* | 7/2021 | Rivera | A47J 31/4407 |
| 2018/0153335 A1* | 6/2018 | Sakane | A47J 31/465 |
| 2019/0021541 A1* | 1/2019 | Kuempel | A47J 31/36 |
| 2019/0290048 A1* | 9/2019 | Albanese | A47J 31/521 |
| 2020/0113369 A1* | 4/2020 | Bardot | A47J 31/20 |
| 2020/0178724 A1* | 6/2020 | Kihara | A47J 31/06 |
| 2020/0297153 A1* | 9/2020 | Jacobs | A47J 31/5253 |
| 2020/0359829 A1* | 11/2020 | Light | A47J 31/42 |
| 2022/0167776 A1* | 6/2022 | Munsinger | A23F 3/18 |
| 2023/0000287 A1* | 1/2023 | Kim | A47J 31/44 |
| 2023/0148786 A1* | 5/2023 | Yiu | A47J 31/0636 |
| | | | 99/287 |

* cited by examiner

COLD BREW COFFEE APPARATUS

CROSS REFERENCE TO RELATED APPLICATIONS

This application claims priority to U.S. Provisional application 62/892,929 filed on Aug. 28, 2019 which is incorporated herein by reference in its entirety.

TECHNICAL FIELD

The present invention is directed to the field of coffee makers and related devices for and methods of brewing coffee. More specifically, the present invention is directed to a coffee maker including a brew chamber having a rotatable component for use in brewing cold brew coffee and its use.

BACKGROUND

Where a coffee plant is grown, the amount of sunlight and water the coffee plant receives, and how resulting coffee beans are roasted all greatly impart a unique and distinct taste to the coffee bean. However, the way coffee is brewed can be just as influential on the resulting flavor profile. Coffee beans contain various solubles such as oils and acids that when the beans are ground and brewed in water, give the resulting coffee distinct flavors. Some of the ways to adjust the strength, flavor, and acidity profile of coffee include varying the temperature of water used to brew the coffee and the length of contact between the water and the beans (steeping time).

Conventionally, coffee is a hot brewed beverage formed by passing heated water through coffee beans that have been roasted and ground. When hot water of a certain temperature is introduced to ground coffee, solubles from the coffee grounds dissolve, resulting in a hot coffee beverage having a full-bodied flavor. Aromatics are also extracted during this brewing process, which over the course of brewing, begin to degrade and oxidize and can result in the hot coffee having a somewhat bitter, sour, and/or acidic taste. Hot coffee typically has a pH ranging around 5 or slightly lower. This low pH can cause some consumers to experience stomach irritation. For consumers suffering pre-existing conditions such as acid reflux or frequent heartburn, hot coffee is often restricted entirely or suggested for consumption only in moderation. Coffee brewed in this manner is generally served hot or alternatively, cold by pouring the coffee over ice.

Unlike hot coffee poured over ice, or using leftover stale coffee to make cold coffee beverages, cold brew coffee is a brewed beverage formed by steeping roasted and ground coffee beans in cold water for 12 to 24 hours. During the steeping process, the solubles typically extracted in hot brewed coffee, including oils and acids that give hot brewed coffee its signature taste and aroma, are released more slowly and over a longer period of time. This cold brew process results in a coffee that is less bitter and up to 65% less acidic than traditional hot brewed coffee. Because of the decrease in acidity and bitterness, cold brew coffee appeals to a wide variety of consumers, especially ones that typically avoid the acidity and bitterness of hot coffee.

Over recent years, the consumption and popularity of coffee prepared by a cold brew process has increased substantially. This increase in popularity has led to a corresponding increase in the number of options consumers have when selecting a cold brew coffee beverage. Ready-made beverages at retail stores, menu selections at coffee shops, and a variety of home brew methods are all available options when consumers are selecting a cold brew beverage. While the options for cold brew are abundant, there are some factors inherent to the cold brew process that decrease the appeal of the beverage.

While ready-made, pre-packaged beverages often appeal to consumers who want a quick and easy, on the go beverage, these beverages are often costly. Coffee shops provide an attractive option for those seeking cold brew beverages but can be similarly expensive and more difficult to find due to location or because coffee shops often sell out of cold brew. An increasingly popular alternative to ready-made, pre-packaged cold brew beverages and coffee shop options is for consumers to make their own cold brew coffee at home or their office.

Over the years, the ways of making cold brew coffee at home has increased, however the simple principles of making the beverage have remained relatively the same. One such method of making cold brew coffee at home is through the use of an immersion method in which ground coffee is placed in a large pot or container and water is poured over the grounds. The grounds are left to steep for at least 12 hours, at which time the mixture is poured through a filter, separating the liquid and grounds. For smaller batches of cold brew coffee, the same immersion method can be used in combination with a French Press coffee maker for filtering the grounds from the liquid after steeping. Although both methods are relatively simple and straightforward, both methods require the grounds to be stirred throughout the 12 hours steeping process.

An alternative home brew method is the use of an ice drip coffee tower. An ice drip coffee tower generally comprises an upper chamber that is filled with ice, a middle chamber filled with coffee grounds, and a lower chamber to receive the liquid. Over time, ice in the upper chamber melts and drips over the grounds in the middle chamber. The liquid slowly seeps through the grounds and is received in the bottom chamber. A major drawback to using the ice drip coffee tower is its price, which can be in the hundreds of dollars and despite the price, this method still requires a considerable amount of time to complete.

Slow drip coffee makers are yet an even other alternative method for making cold brew coffee. This method requires placing grounds in a supported filter that is rested on or placed above a receiving container. A pre-determined amount of water is poured over the grounds and over time the water seeps through the grounds into the receiving container. This simplicity of this method is appealing, but it still requires a considerable amount of time for the brewing process to be completed.

As popularity and demand for cold brew coffee increases, there remains a need to improve upon devices and methods that consumers use to make cold brew coffee. Preferably, these improved devices result in cold brew coffee having the desired properties while being easy to use, have reduced preparation times, and are affordable to consumers.

SUMMARY

Embodiments relate to cold brew coffee makers and methods for brewing cold brew coffee using the cold brew coffee makers. More specifically, exemplary embodiments of a cold brew coffee maker include a base assembly, a rotation assembly, a filtration assembly and a brew chamber.

A cold brew coffee maker according to an exemplary embodiment comprises a rotation plate assembly, a filtration assembly and a brew chamber. The rotation plate assembly can comprise a control knob and a rotatable, internal magnetic field generator. The control knob and rotatable, internal magnetic field generator are used to induce a rotating magnetic field at an upper mounting surface of the rotation plate assembly. In an exemplary embodiment, the rotation plate assembly comprises an internal magnetic component for generating rotational movement of a selectively attachable component of a removable cup. The removable cup comprises a detachable impeller and removable plate. The detachable impeller and removable plate engage with the rotation plate assembly via a magnetic coupling connection. In certain exemplary embodiments, the impeller is permanently attached rather than removable. In an "on" mode, the impeller engages with the rotational plate assembly and internal magnetic component, allowing for rotational movement of the impeller. In an "off" mode, the impeller and magnetic component are freely moveable and able to disengage, allowing for easy separation of all assembly components for cleaning or replacement.

In another exemplary embodiment, a cold brew coffee maker comprises a rotation plate assembly, a cup, and a brew chamber. The rotation plate assembly can comprise an internal magnetic component for generating rotational movement of a selectively attachable component of the cup. The cup can comprise a bottom plate, an impeller and a spindle coupled to the bottom plate. The impeller and spindle can engage with the rotation plate assembly by a magnetic connection. In the "on" mode, the impeller engages with the rotational plate assembly and internal magnetic component, allowing for rotational movement of the impeller. In the "off" mode, the impeller and magnetic component are freely moveable and able to disengage, allowing for easy separation of all assembly components for cleaning or replacement.

In yet another exemplary embodiment, a cold brew coffee maker can comprise a rotation plate assembly, a cup, a brew chamber, and a filtration assembly. The filtration assembly can comprise a filtration disc, and an attached rod for removal of the filtration disc and filter. In an alternative exemplary embodiment, the filtration assembly can also comprise a lid for covering the opening of the brew chamber. The filtration disc can be manipulated to retain ground coffee in the brew chamber, allowing freshly brewed cold brew coffee to be separated from ground coffee and to allow the ground coffee to be subsequently removed from the brew chamber and discharged.

In yet another exemplary embodiment, a method for brewing cold brew coffee comprises placing a cup within a brew chamber. The method can further comprise placing ground coffee into the cup within the brew chamber, and filling the brew chamber with cold water. With the ground coffee and water in the brew chamber, the method can further comprise agitation of the ground coffee and water mixture by energizing the rotation plate assembly. When energized, the rotation plate assembly causes an impeller in the cup to engage, via magnetic coupling, with the plate assembly and begin to rotate. This rotation agitates the ground coffee and water mixture, increasing the rate of the steeping extraction process of the coffee over that of the conventional steeping methods. After the ground coffee and water mixture has been agitated and steeped for a desired amount of time, the method further comprises attaching a filtration assembly to the brew chamber. With the filtration assembly attached to the brew chamber, the method can further comprise applying pressure to the filtration disc in the brew chamber to separate freshly brewed coffee from the coffee grounds. In such exemplary embodiments, the filtration assembly engages with the detachable cup to couple the two assemblies. The method can further comprise dispensing the freshly brewed coffee into a coffee mug. In some exemplary embodiments, dispensing the freshly brewed coffee comprises dispensing the coffee from the brew chamber prior to removing the coupled cup and filtration assembly. In other exemplary embodiments, the method can further comprise removing the coupled cup and filtration assembly from the brew chamber prior to dispensing the coffee.

In certain exemplary embodiments, the coupled cup and filtration assembly can be removed from the brew chamber using a rod portion of the filtration assembly. In such exemplary embodiments, the filtration assembly remains coupled to the cup with the result that the steeped coffee grounds are sandwiched between a base of the cup and the filtration disc. The steeped coffee grounds are further retained by side walls of the cup. This method allows for a clean removal of the steeped coffee grounds without infiltration of the coffee grounds in to the freshly brewed coffee.

The above summary is not intended to describe each illustrated embodiment or every implementation of the invention. Rather, the exemplary embodiments are chosen and described so as to provide an overview or framework for understanding the nature and character of the claimed aspects and implementations so that those skilled in the art can appreciate and understand the principles and practices of the invention. The Figures and the detailed description that follow more particularly exemplify these exemplary embodiments, and are incorporated in and constitute a part of this specification.

BRIEF DESCRIPTION OF THE DRAWINGS

These and other features and advantages of the present invention will become better understood with regard to the following description and accompanying drawings in which.

Figure 1:
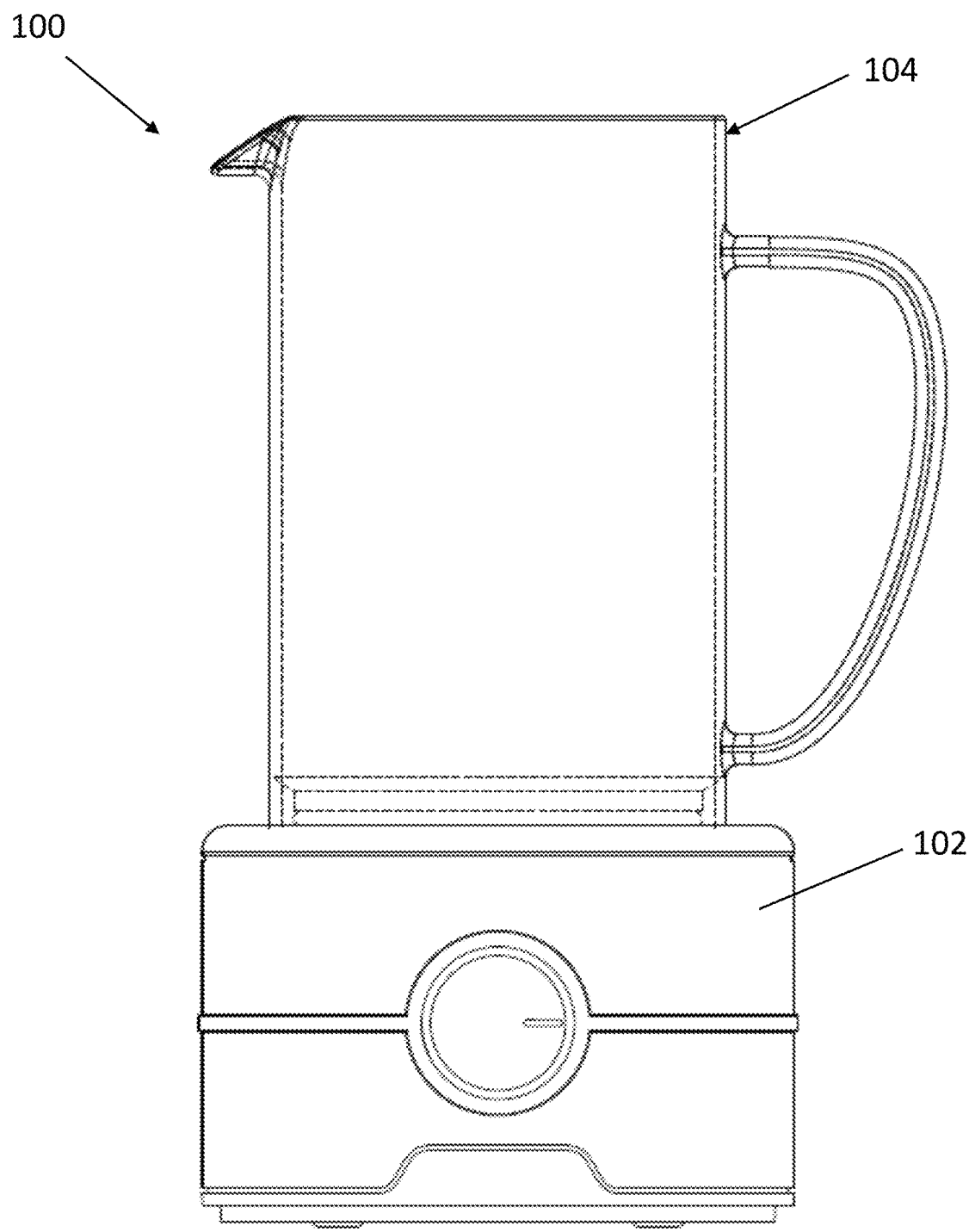
FIG. 1 is a front view of a cold brew coffee maker according to an exemplary embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

As illustrated in FIG. 1, an exemplary embodiment of a cold brew coffee maker 100 can comprise a rotation base assembly 102 and a brew chamber 104. The exemplary Cold brew coffee maker 100 is generally fabricated of materials compatible with temperatures associated with brewing cold coffee and hot coffee as well as cleaning and sanitizing following the coffee brewing process. The rotation base assembly 102 and brew chamber 104 can comprise materials of construction suitable for food contact and compatible with conventional dishwashing methods such as, for example, glass, plastics such as polycarbonate and polyethylene, and material such as stainless steel.

Figure 2:
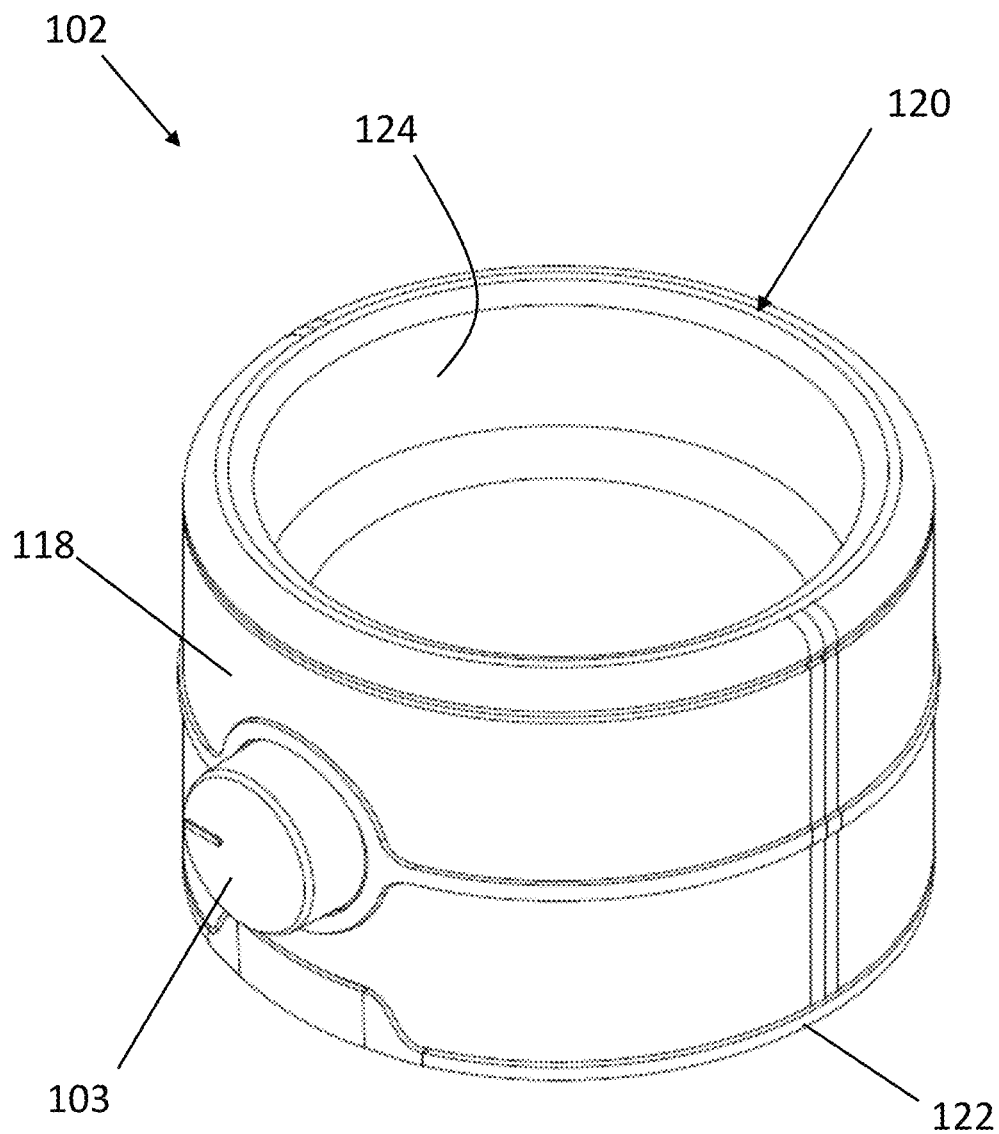
FIG. 2 is a perspective view of the base portion of a cold brew coffee maker according to an exemplary embodiment.

Referring to FIG. 2, rotation base assembly 102 generally comprises a control knob 103 and cylindrical body portion 118 having an upper surface 120 defining a receiving surface 124 and a lower surface 122. The cylindrical body portion 118 generally has a spherical perimeter and a receiving surface 124. Further, control knob 103 is positioned on the exterior of cylindrical body portion 118. Control knob 103 is generally used to control the speed of a rotating magnetic field that can be generated by an internal magnetic assembly (not shown) such as, for example, a rotating magnet or set of stationary electromagnets that are energized in sequence to create a rotating magnetic field. While the Figures presented herein illustrate a control knob 103 as the means for controlling the rotation of the rotating magnetic field, other exemplary embodiments can use control methods such as, but not limited to, on/off switches, multi-position switches, or pushbuttons. Additionally, certain exemplary embodiments may utilize control functions or behaviors such as a soft-start function, a timed multi-speed function wherein the rotation speed varies over time according to a predetermined pattern of behavior, or a timer function wherein the start of rotation may be delayed or rotation may be ended after a predetermined time.

Figure 3:
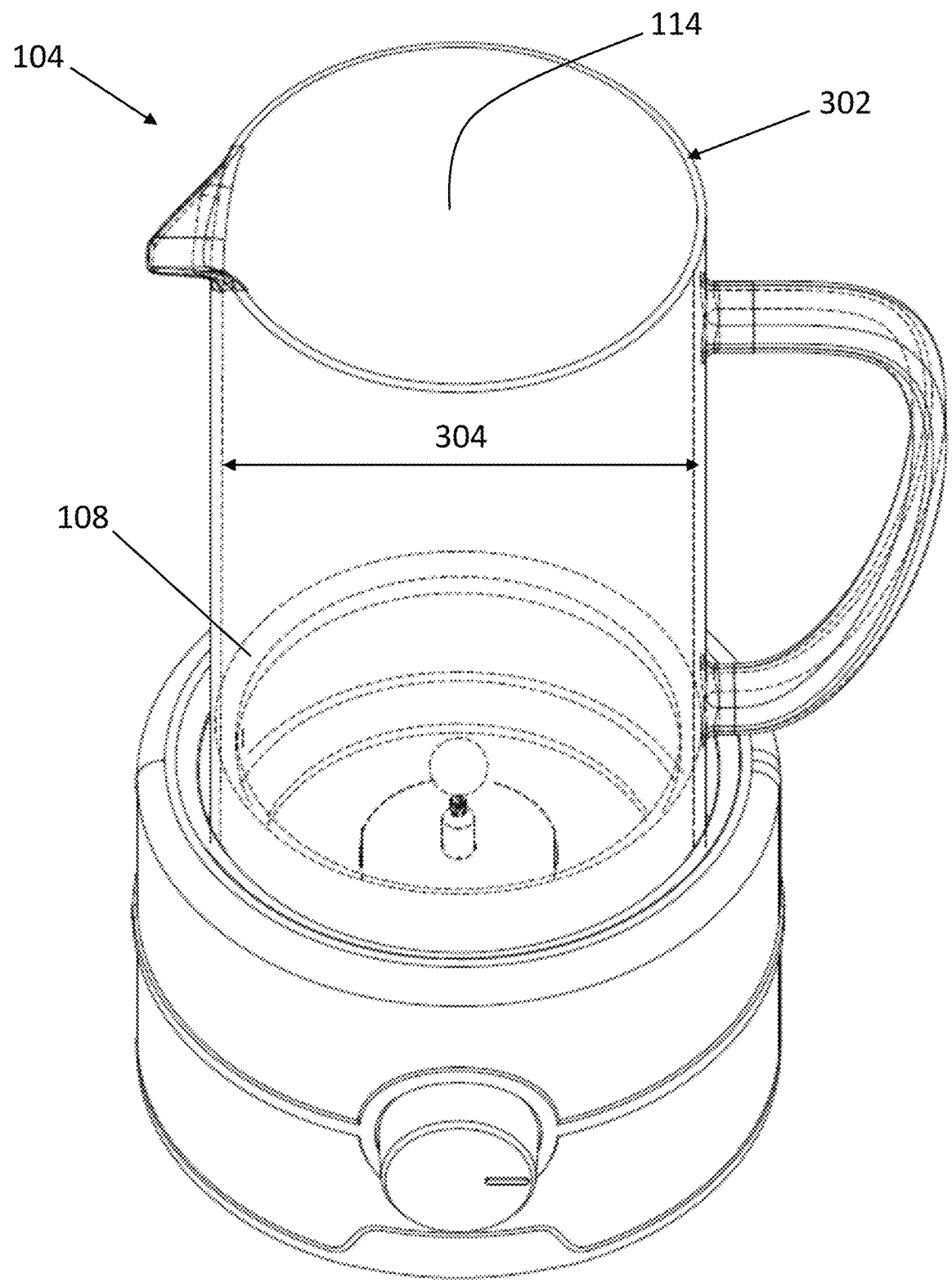
FIG. 3 is a perspective view of a cold brew coffee maker according to an exemplary embodiment.

Referring to FIG. 3, in an exemplary embodiment, the brew chamber 104 generally comprises cylindrical body portion 302 that fits into a space formed in the rotation base assembly 102 by the receiving surface 124. In certain exemplary embodiments, the brew chamber 104 includes a handle and a pouring spout. The cylindrical body portion 302 defines a chamber opening 114 and includes an inner diameter 304 that is only slightly smaller than the diameter of cylindrical body portion 118 of rotation base assembly 102. The cylindrical body portion 302 includes a lower engagement surface (not illustrated) that defines an area of interface between the cylindrical body portion 302 and the cylindrical body portion 118.

Figure 4A:
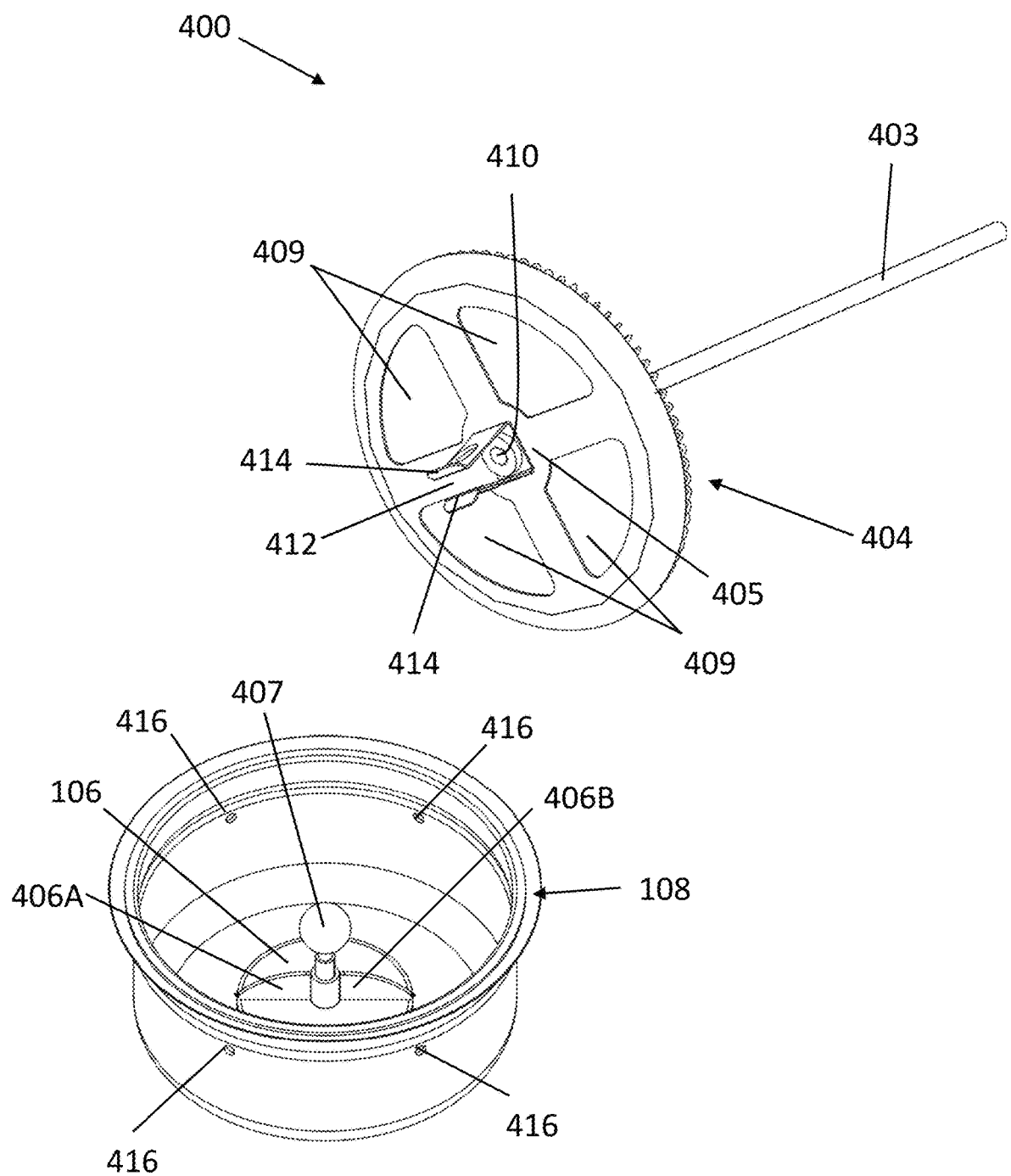
FIG. 4A is a perspective view of a removable cup comprising an impeller and a filtration assembly portions of a cold brew coffee maker according to an exemplary embodiment.
Figure 4B:
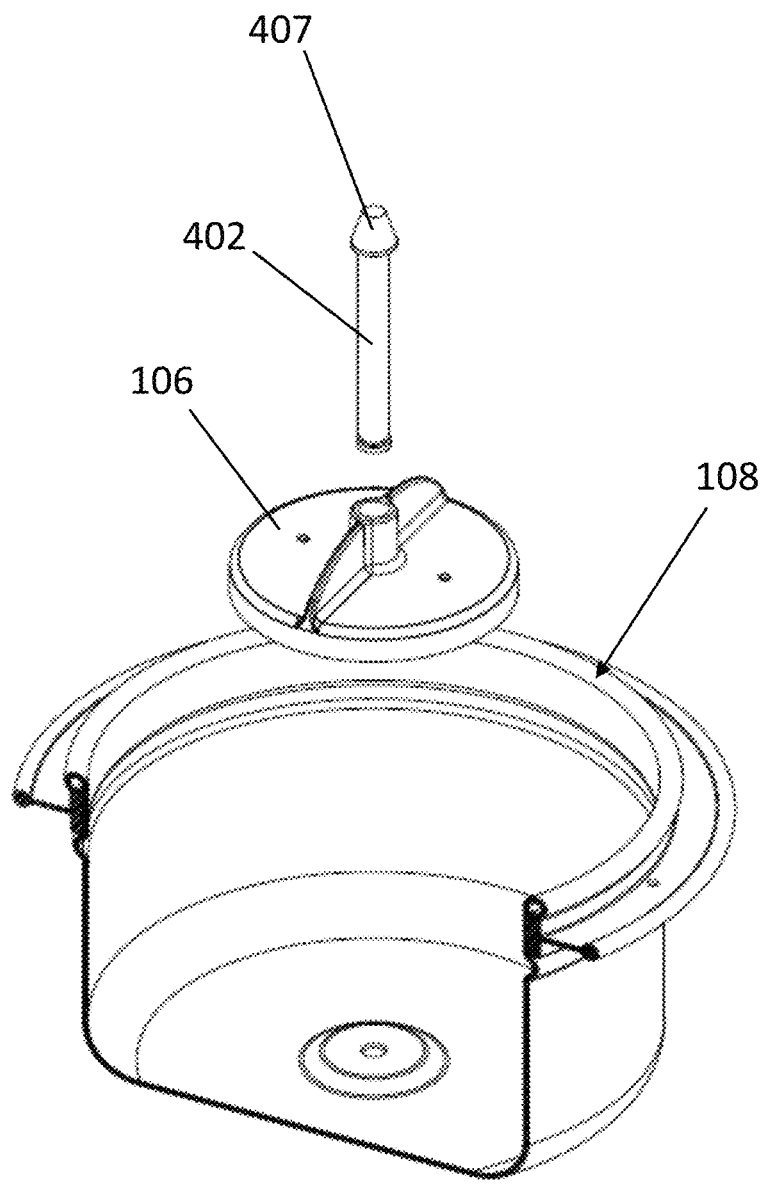
FIG. 4B is a cutaway view of a removable cup portion of the assembly shown in FIG. 4A.

Referring to FIG. 4A, in certain exemplary embodiments, a removable cup 108 sized to allow for positioning within the cylindrical body portion 302 (refer briefly to FIG. 3). In exemplary embodiments, the removable cup 108 rests atop the lower engagement surface and an impeller 106 mounts to the removable cup 108. As is illustrated in FIG. 4B, the impeller 106 is mounted using a spindle 402 about which the impeller 106 rotates during use. Impellers 106 as utilized in exemplary embodiments are understood to comprise suitable magnetic material capable of spinning in response to the rotating magnetic field generated by the rotation base assembly 102.

Figure 4C:
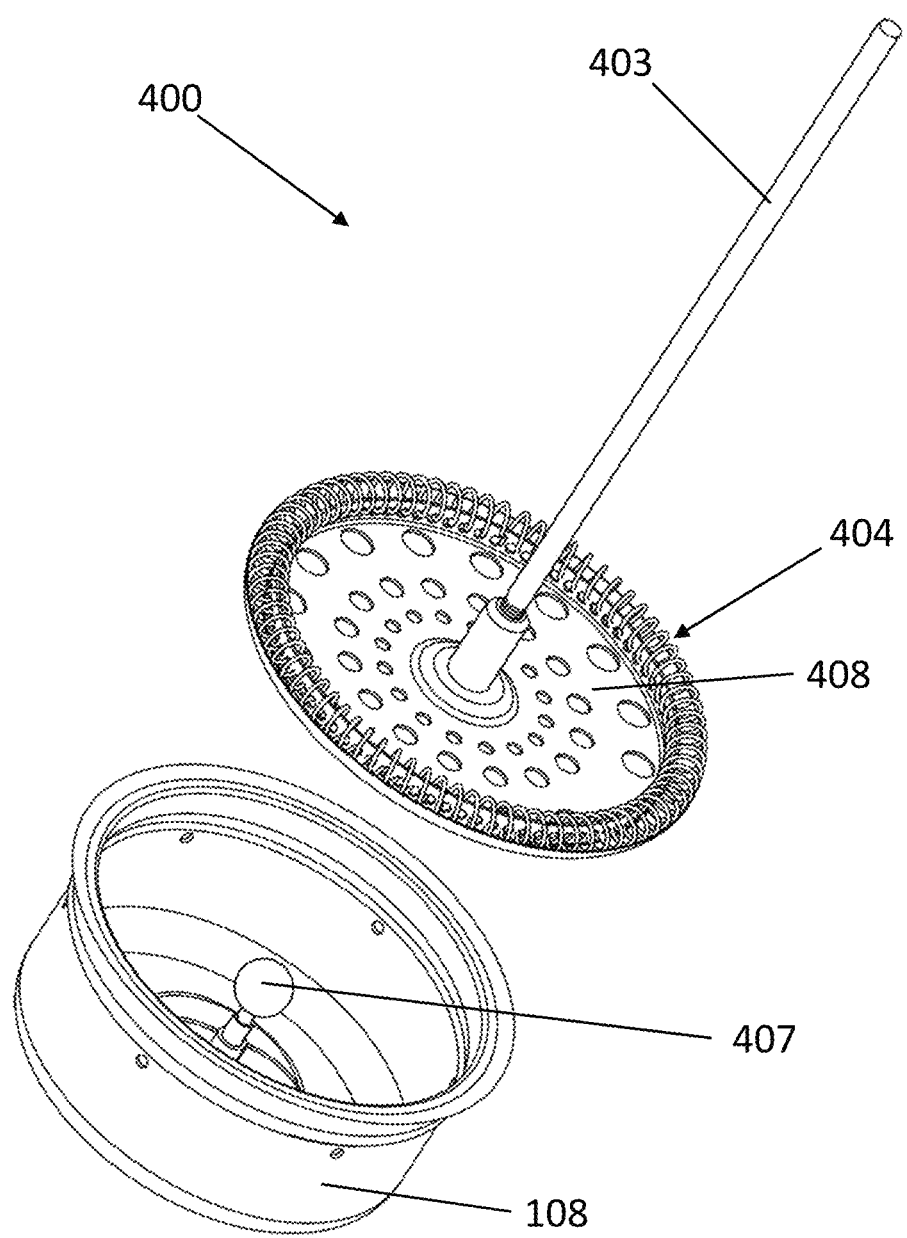
FIG. 4C is a perspective view of the removable cup and filtration assembly of FIG. 4A.
Figure 4D:
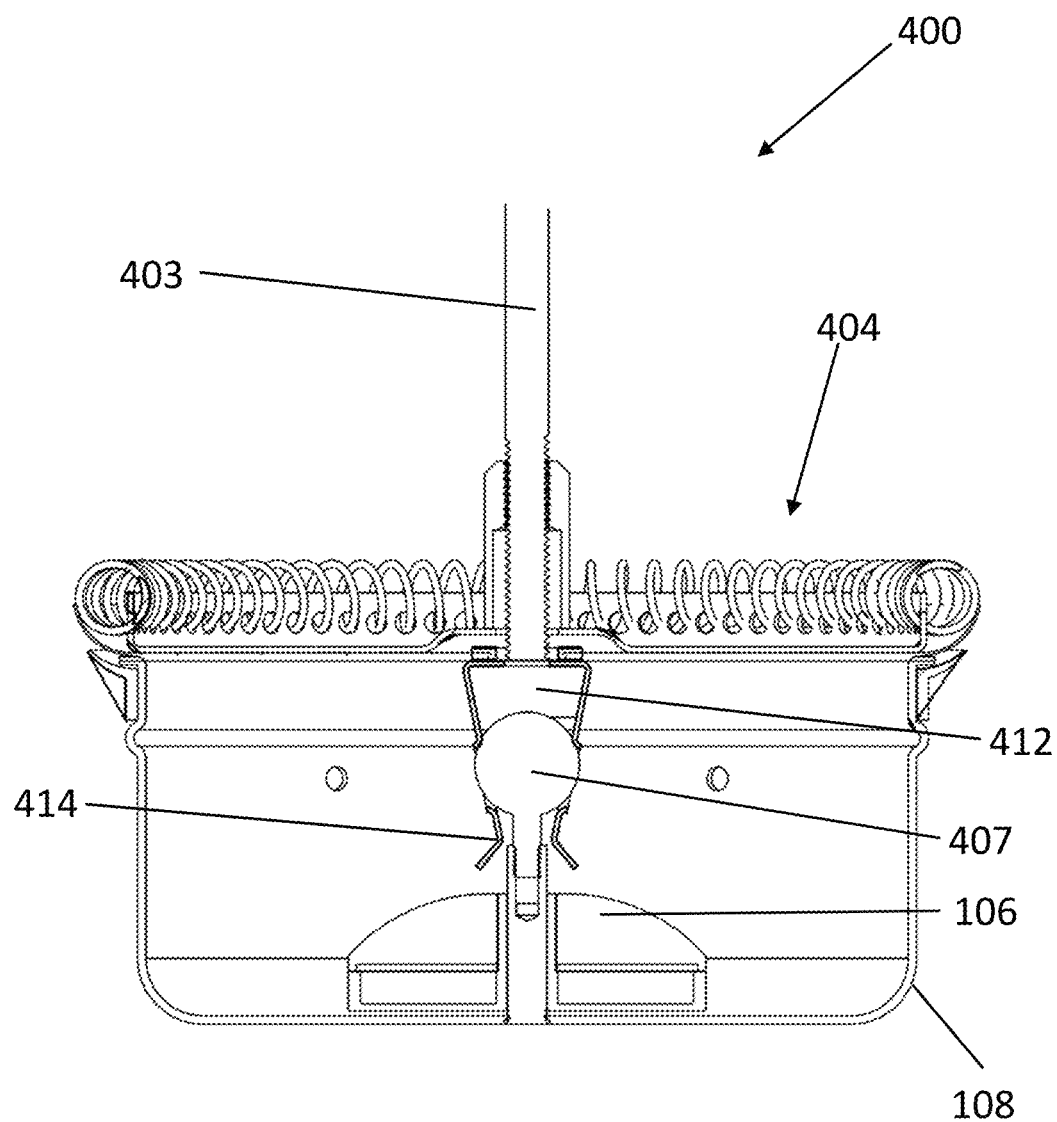
FIG. 4D is a side cutaway view of the cup and filtration assembly of FIG. 4A shown with the filtration assembly engaged with the removable cup.
Figure 5:
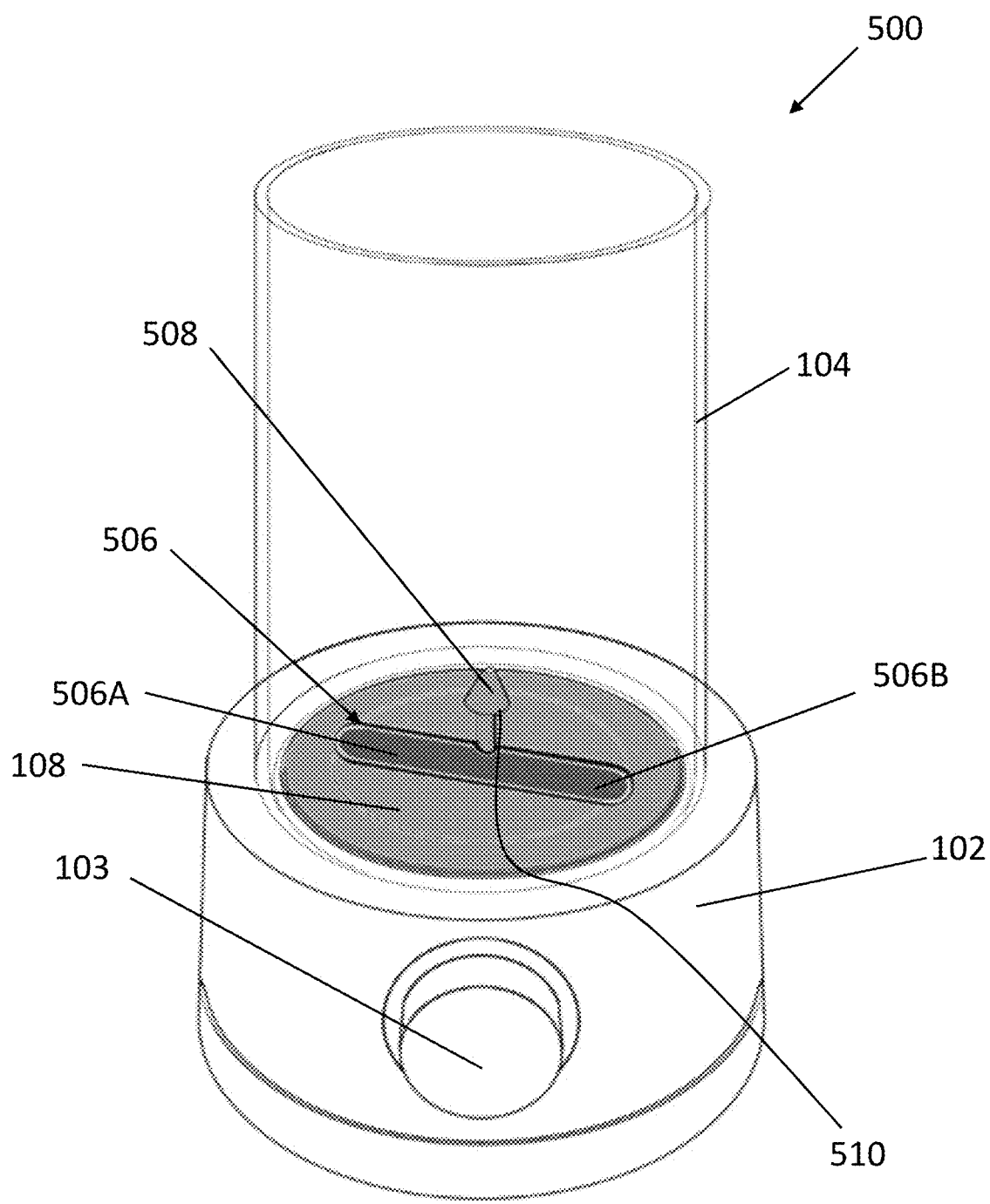
FIG. 5 is a perspective view of a cold brew coffee maker according to another exemplary embodiment.
Figure 6:
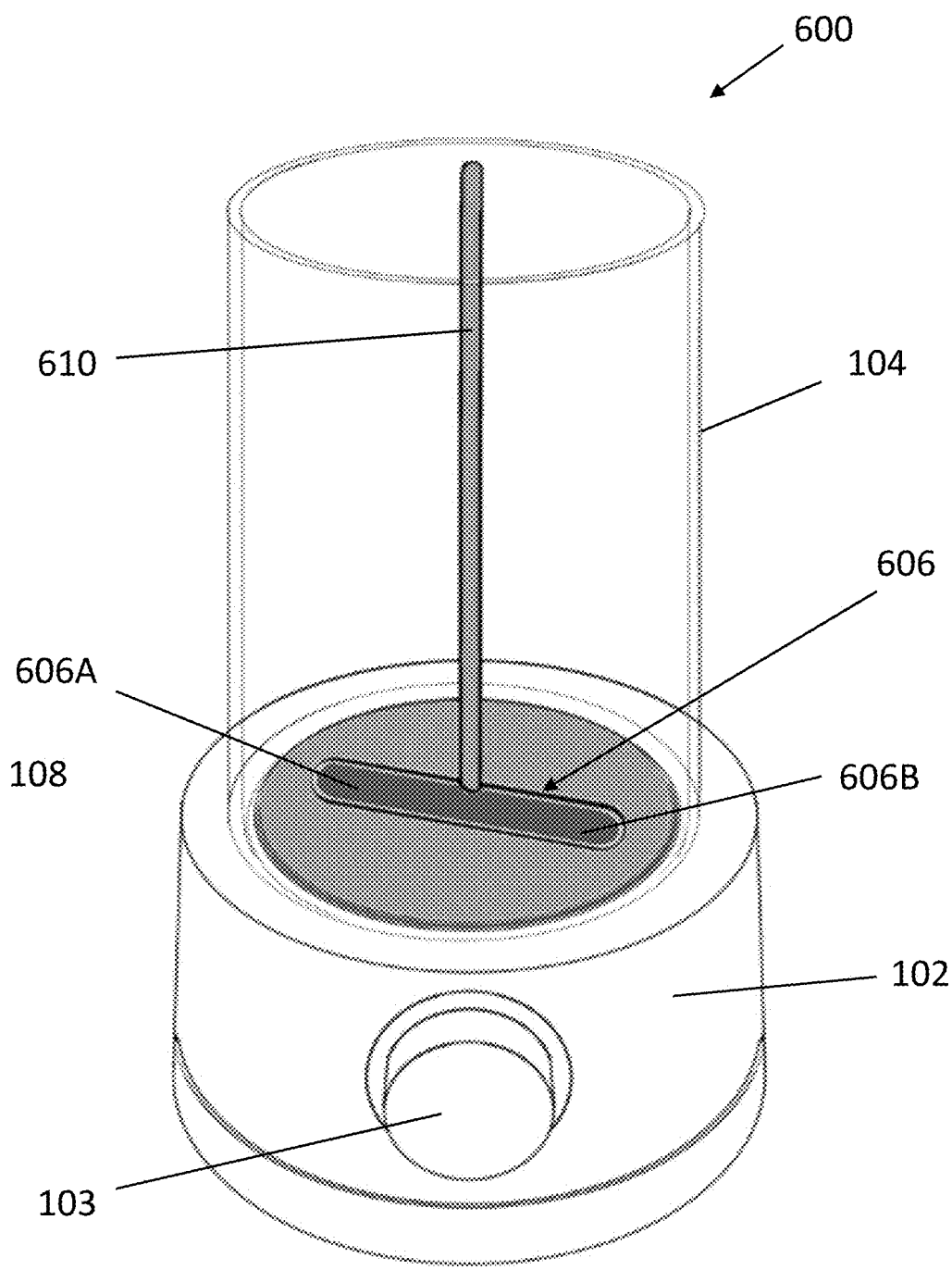
FIG. 6 is a perspective view of a cold brew coffee maker according to another exemplary embodiment.

As illustrated in FIGS. 5, and 6, certain exemplary embodiments of cold brew coffee makers 500 and 600 can be similar in design to the exemplary embodiment of the cold brew coffee maker 100 but with variations in the impeller design. As seen in FIGS. 4A, 4B, 4C, 5, and 6, impeller 106, 506 and 606 respectively can comprise two arms (406A and 406B, 506*b*, 606*a* and 606*b*) positioned directly across from one another. In alternative embodiments, impeller 106, 506, 606 can have more than two or less than two arms. As illustrated in FIGS. 4A-4D, the spindle 402 can further comprise a spindle head 407 which is positioned above the impeller 106. As illustrated in FIG. 4A, the spindle head 407 comprises a spherical shape while the spindle head 508 of FIG. 5 comprises a cone or barbed shape that includes a capture lip 510. As shown in FIG. 6, impeller 606 can be integral to an elongated spindle 610.

Referring again to FIGS. 4A, 4B, and 4C, an exemplary cold brew coffee maker 100 further comprise a filtration assembly 400. The filtration assembly 400 generally comprises a rod 403, filtration disc 404 and rod base 410. The filtration disc 404 generally includes a central mounting area 405 and a perforated surface 408 to which the rod 403 and rod base 410 are attached. In an exemplary embodiment, a filter media 409 is sandwiched between the central mounting area and the perforated surface to allow liquid to pass through the filtration assembly while preventing the passage of solids. The rod base 410 can also comprise a spindle head capture area 412 which is defined by one or more resilient members 414. In use, the one or more resilient members 414 can be positioned over the spindle head 407 of the impeller 106 such that the spindle head 407 is retainably captured within the spindle head capture area 412 such that rod base 410 is in proximity to the removable cup 108. Because the removable cup 108 is positioned in the brew chamber 104 when water is added to begin the steeping process, weep holes 416 are formed in the removable cup 108 in certain exemplary embodiments to permit a small amount of liquid (water or coffee) to flow into the space between the walls of the removable cup 108 and the brew chamber 104.

As was illustrated in FIG. 5, In another exemplary embodiment, the capture lip 510 of spindle head 508 can be captured by resilient member 414.

FIG. 4D depicts a cross sectional view of the filtration assembly 400 attached to the spindle head 407. According to exemplary embodiments, the rod 403 is connected at the center of the filtration disc 404. The rod base 410 is also be connected at the center of filtration disc 404 on the directly opposing side of the connecting site of rod 402. The spindle head capture area 412 can be positioned over the spindle head 407 using the one or more resilient members 414.

Figure 7:
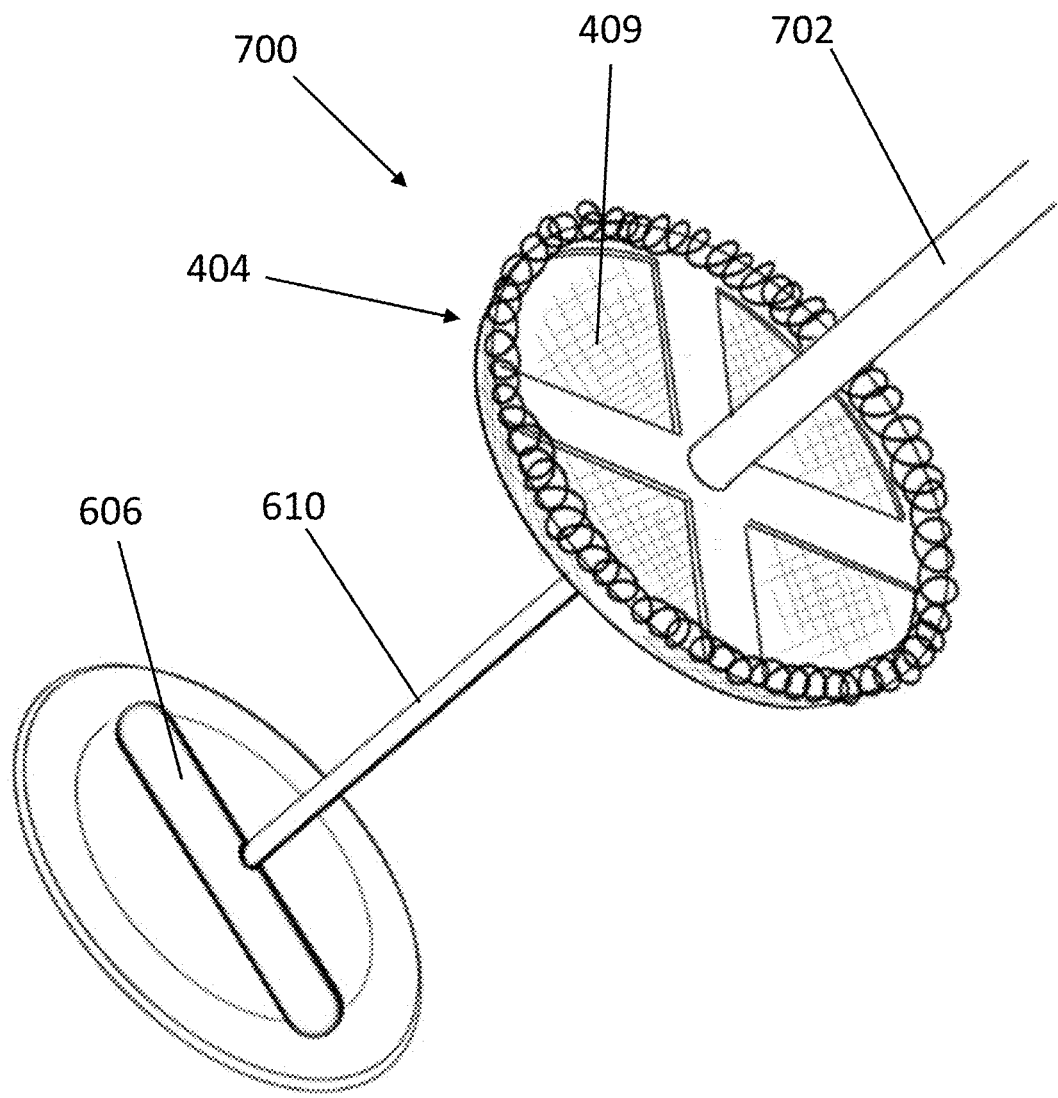
FIG. 7 is a perspective view of an alternate impeller and filtration assembly according to another exemplary embodiment.

In another exemplary embodiment as illustrated in FIG. 7, a filtration assembly 700 can be configured to mount over the elongated spindle 610 (refer to FIG. 6). In this exemplary embodiment, the elongated spindle 610 is permanently connected to impeller 606. The exemplary filtration assembly 700 comprises a hollow spindle housing 702 that slides over the elongated spindle 610.

Figure 8:
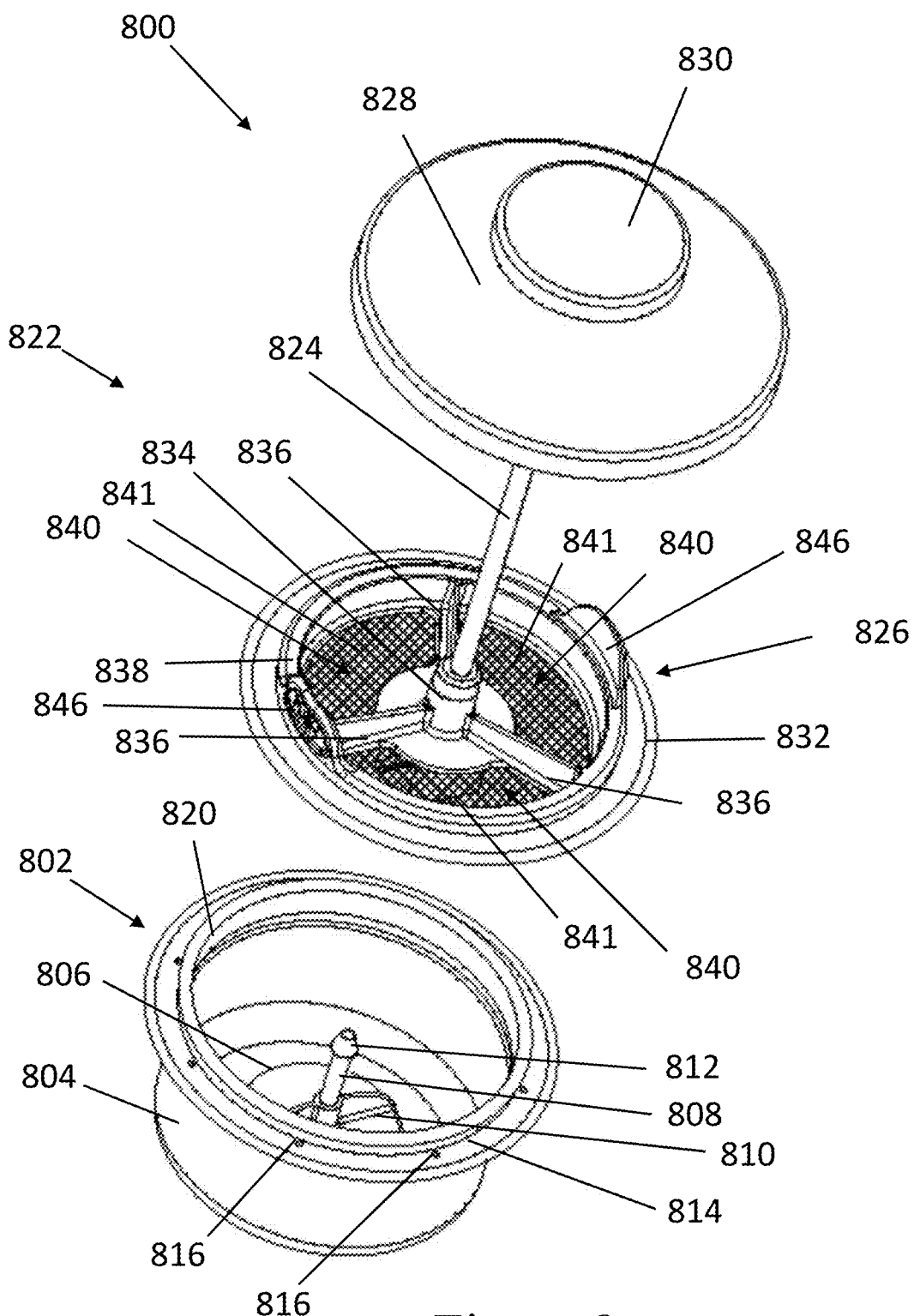
FIG. 8 is a perspective view of an another alternate removable cup and filtration assembly according to an exemplary embodiment.
Figure 9:
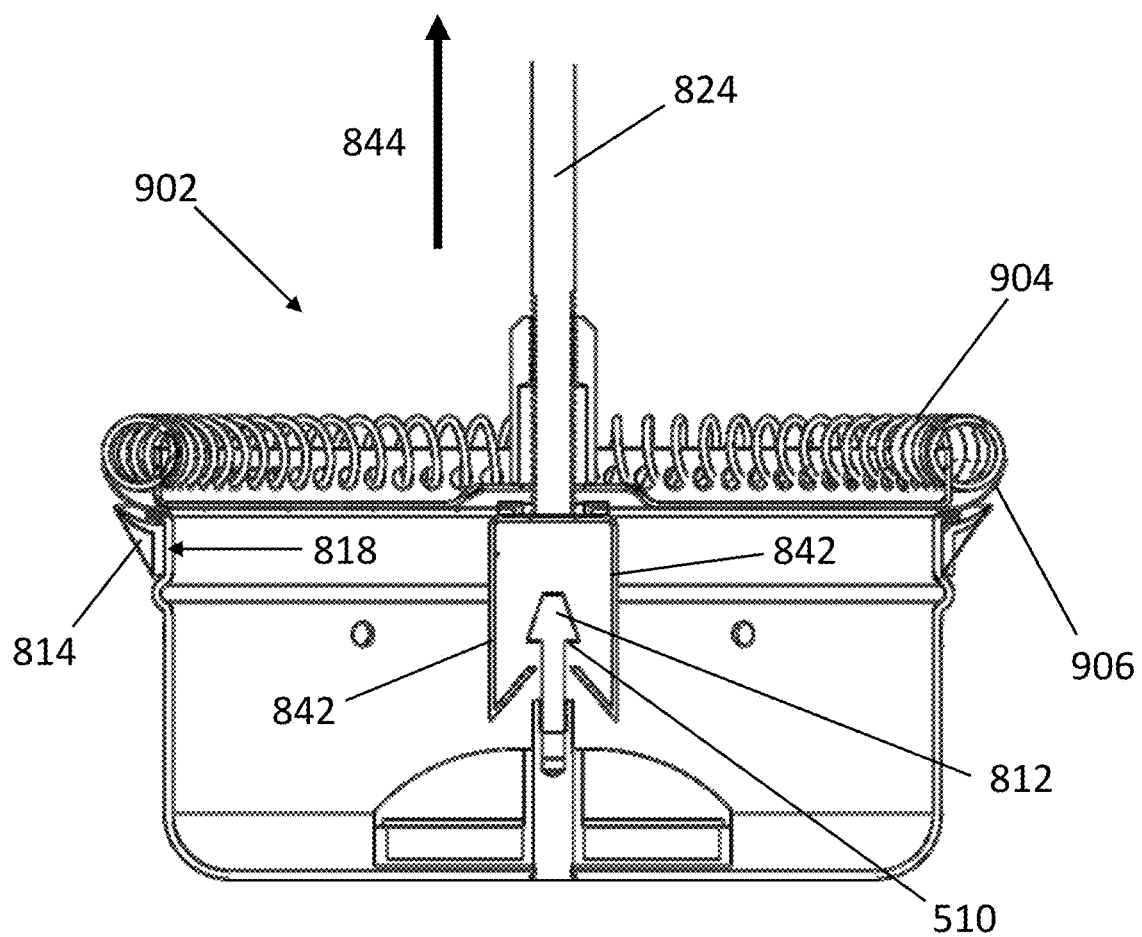
FIG. 9 is a side cutaway view of a removable cup and filtration assembly according to an exemplary embodiment.

As was disclosed in FIG. 5, an exemplary embodiment can include a spindle head with cone or barb shape. FIG. 8 illustrates perspective view of a removable cup/filtration assembly 800. In the illustrated embodiment, the removable cup 802 comprises a circular body 804 with a floor plate 806 to which a spindle 808 is affixed. An impeller 810 is rotatably mounted on the spindle 808 and held in place by the spindle head 812 which is cone or barbed shaped similar to what was illustrated in FIG. 5. In the illustrated embodiment, the impeller 810 is illustrated with two arms but more or less arms may be used in certain embodiments. A flexible sealing flange 814 is mounted to the removable cup. In exemplary embodiments, the sealing flange 814 may be captured by a recess 818 (illustrated in FIG. 9) formed in the circular body 804, formed such that is wraps around an upper flange 820, or held in place with adhesives. Alternatively, the removable cup 802 can be formed of a material with flexible properties to provide a sealing flange function. As illustrated, some exemplary embodiments may incorporate weep holes 816 into the sealing flange 814 to allow liquids to move between the removable cup 802 and the brew chamber 104 when the removable cup 802 is installed into or removed from the brew chamber 104 as will be discussed herein. The exemplary embodiment of a filtration assembly 822 illustrated includes a rod 824, filtration disk 826, cover 828 and filtration handle 830. The filtration handle 830 is illustrated as a disk shape with a flat upper surface but could also be other shapes, including, spherical, cubic, etc. The cover 828 is sized to cover an opening formed at the upper portion of the brew chamber (not shown). As will be discussed herein, in certain exemplary embodiments, the filtration disk 826 is moved along the inner diameter of a brew chamber. As shown, a flexible edge portion 832 is formed at the outer circumference of the filtration disk 826 to reduce the amount of coffee grounds that pass between the filtration disk 826 and brew chamber 104. The rod 824 is held in place via a central hub 834. The central hub is located by arms 836 that extend from the central hub to an outer ring 838. As illustrated, openings 840 are formed between the arms 836 and outer ring 838. In certain exemplary embodiments, these openings 840 are filled with mesh 841 or other liquid permeable material. For example, a plastic or metal screen may be used in certain exemplary embodiments. The mesh material 841 used to fill the openings 840 should be selected such that brewed coffee can pass through the mesh 841 but coffee grounds are substantially prevented from passing through the mesh 841. FIG. 9 illustrates resilient members 842 positioned such that the resilient members 842 will engage the capture lip 510 if the rod 824 is moved in the direction of arrow 844. It should be noted that the filtration disk 902 illustrated represents an alternative exemplary embodiment and comprises a coiled spring 904 rather than the flexible edge portion 832 of FIG. 8. This coiled spring 904 holds a mesh material 906 against the walls of the brew chamber to prevent coffee grounds from passing between the filtration disk 902 and walls of the brew chamber.

Figure 10A:
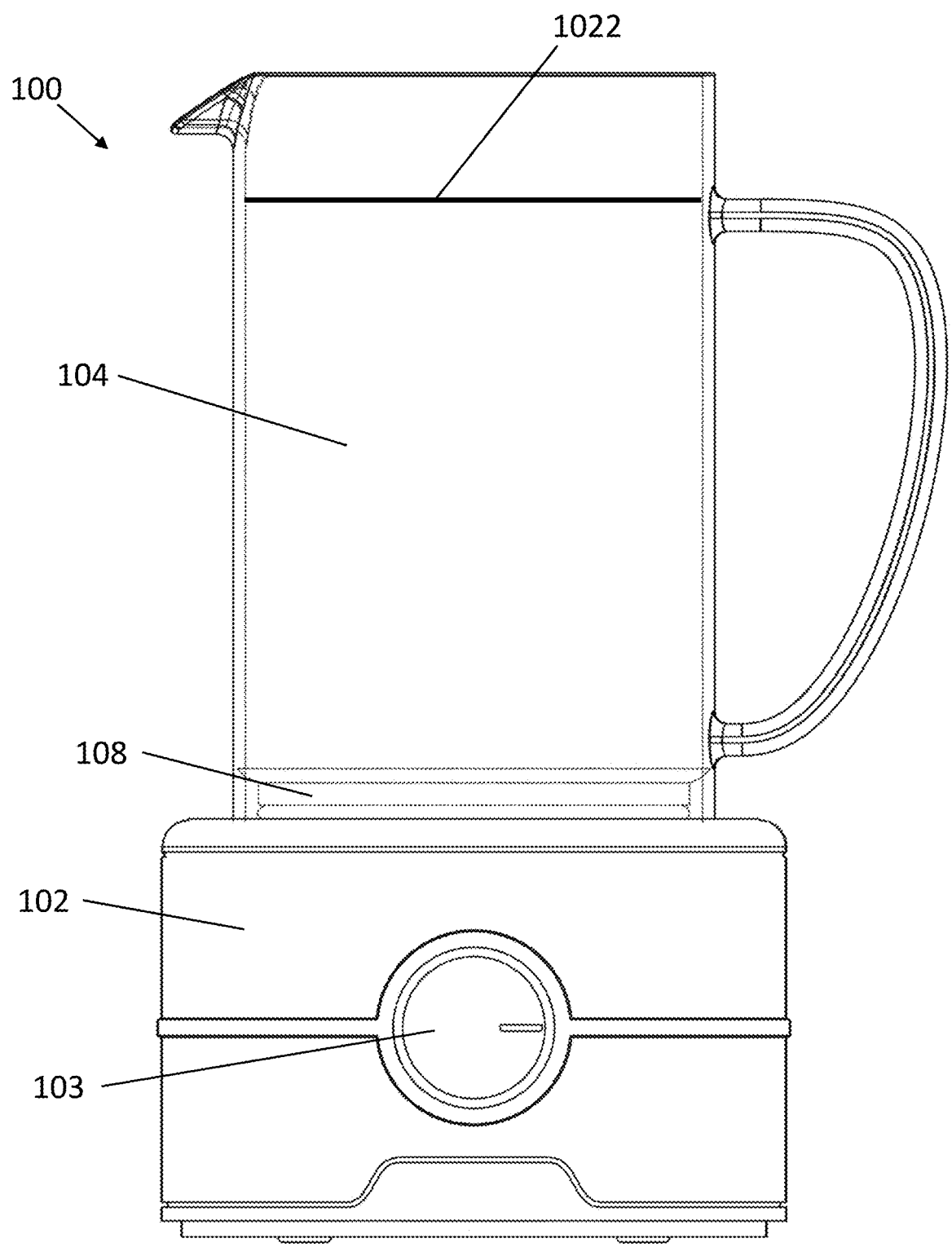
FIGS. 10A-10E are side views of an exemplary embodiment illustrating a method of preparing cold brew coffee according to an exemplary embodiment.

FIGS. 10A-10E further illustrate a method of utilizing a cold brew coffee maker 100 according to representative embodiments of the invention and as specifically referenced with respect to cold brew coffee maker 100 as depicted in FIG. 1. It will be understood that though there may be physical differences related to impeller and filtration assembly designs as previously disclosed, the method of making cold brew coffee is substantially similar for the various exemplary embodiments of cold brew coffee makers. As generally illustrated in FIG. 10A, an exemplary embodiment of a cold brew coffee maker 100 comprises a rotation base assembly 102, a control knob 103, a brew chamber 104, an impeller 106, removable cup 108 and spindle 402 (examples of which are illustrated in FIGS. 4A-4C). To assemble the cold brew coffee maker 100 for use, the brew chamber 104 is first positioned such that it is securely mounted on the rotation base assembly 102 as shown in FIGS. 10A-10E. In certain exemplary embodiments, the impeller 106 is secured to the removable cup 108 and the spindle 402 is secured to impeller 106 via the attachment of the spindle head 407. In other exemplary embodiments, these elements are assembled such that spindle 402 and spindle head 407 are permanently affixed to the removable cup 108 and as such the impeller 106 is not removable. The removable cup 108 is advanced down the brew chamber 104 until it rests upon the bottom of brew chamber 104. This is shown in FIG. 10A.

Figure 10B:
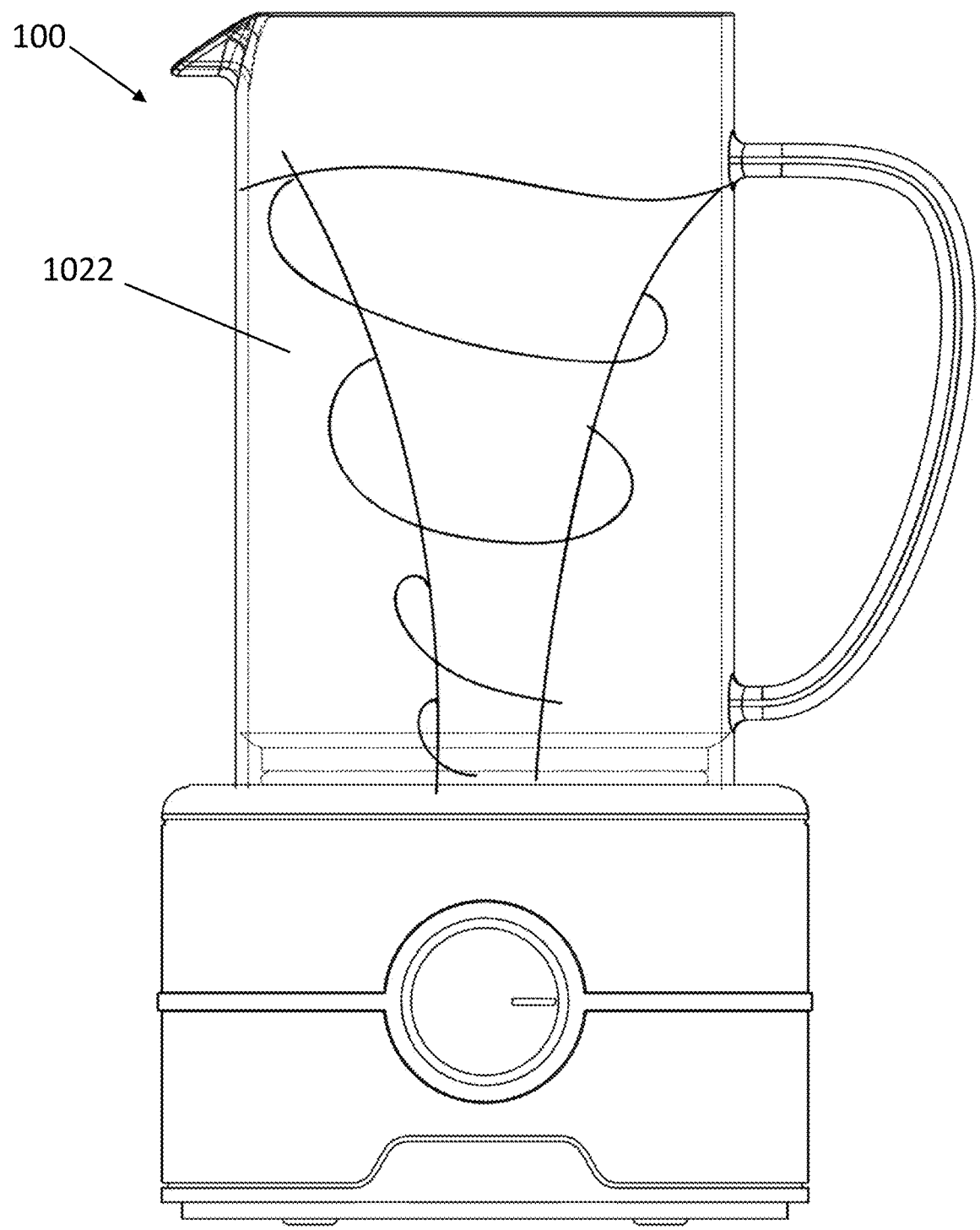
Figure 10C:
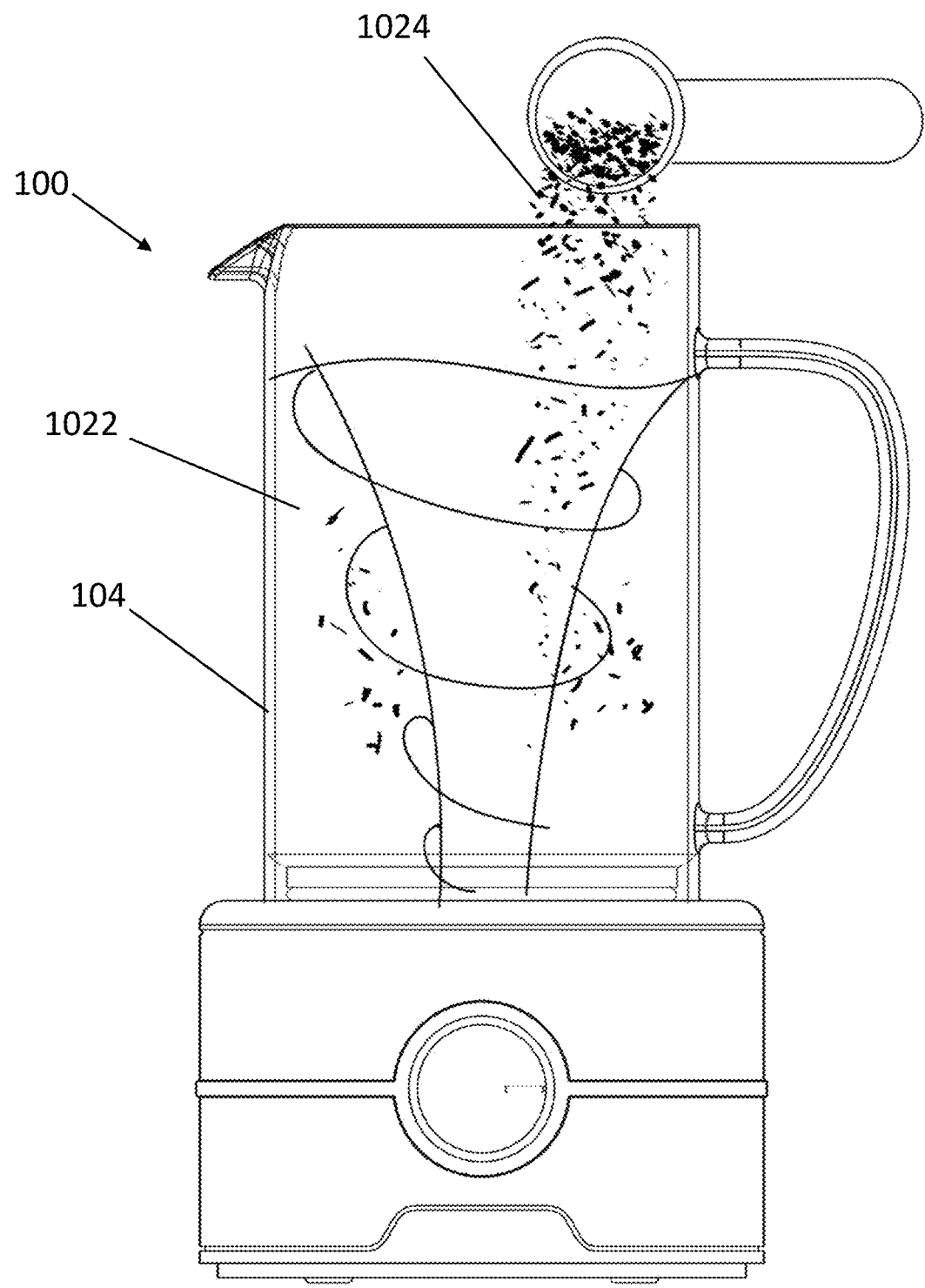

Once the removable cup 108 is positioned in the brew chamber 104 as illustrated in FIG. 10A, a liquid 1022, i.e. water, that is suitable for making cold brew coffee is added to brew chamber 104 as illustrated in FIG. 10A. After the liquid 1022 is added to the brew chamber 104, the knob 103 is used to control a rotation speed of the internal magnetic field created by the rotation base assembly 102, for example, by rotating the control knob 103 clockwise from lower to higher settings. The result is the adjustment of the rotation speed of impeller 106 so as to agitate and mix liquid 1022 (see FIG. 10B). In other exemplary embodiments, the control knob 103 may be replaced by a simpler control such as an on/off switch. In such embodiments, the rotation speed of the impeller is fixed or may be automatically controlled by speed control electronics located in the rotation base assembly 102. Referring now to FIG. 10C, when the liquid 1022 is agitated, coffee grounds 1024 are added to the agitated liquid 1022 in brew chamber 104. In some exemplary embodiments, cold brew coffee maker 100 continues to agitate the mixture or liquid 1022 and coffee grounds 1024 for an extended period of time. In an alternative exemplary embodiment, cold brew coffee maker 100 agitates coffee grounds 1024 until they are blended with liquid 1022. After a desired length of agitation, the control knob 103 is turned to the "off" position, thereby causing the magnetic field and impeller 106 to stop rotating. The coffee grounds 1024 are left to steep in liquid 1022. The agitation of the liquid 1022 and coffee grounds 1024 substantially speeds the process of preparing cold brew coffee when compared to traditional steeping methods and devices.

Figure 10D:
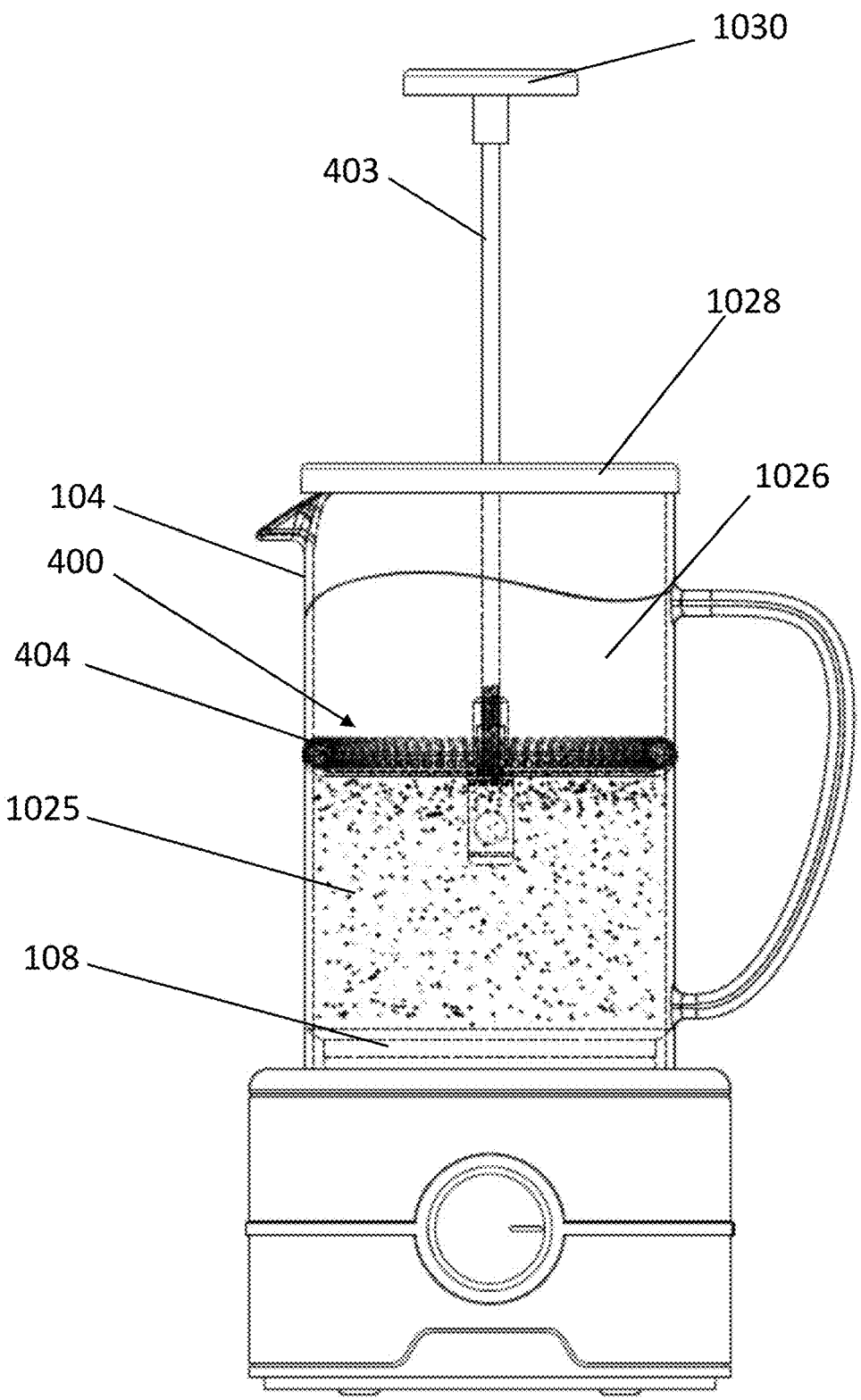

Referring to FIG. 10D, at this point, the brew chamber 104 holds a mixture 1025 in which coffee grounds are suspended. Serving this mixture 1025 would be undesirable. Thus, the next step in the exemplary brewing process is to filter the coffee grounds 1024 from the mixture 1025 to produce cold brew coffee 1026. Generally, a filtration assembly 400 is positioned above the brew chamber 104 such that the filtration disc 404 can be positioned into an upper opening of the chamber 104. As seen in FIG. 10D, filtration assembly 400 can include a lid 1028 through which a rod 403 is slidably mounted. With the filtration disc 404 positioned within the brew chamber 104, the lid 1028 is coupled to the chamber opening 114 to provide lateral support and confirm proper positioning of the filtration assembly 400 relative to the chamber 104 as the coffee grounds 1024 are removed from the cold brew coffee 1026. Generally, the user can apply pressure to a filtration handle 1030 at an outer end of the rod 403 whereby the filtration disk 404 is directed downward relative to the lid 1028 and toward the removable cup 108. It will be understood that filtration assembly 700 illustrated in FIG. 7 operates in a similar manner to that of the exemplary embodiment of FIGS. 10A-10E but with the hollow spindle housing 702 sliding over the spindle 610 as the filtration disk 404 is directed downward.

Referring again to FIG. 10D, filtration disc 404 is continually lowered by applying pressure to the filtration handle 1030 until the resilient members 414 approach and contact the spindle head 407. As the filtration disc 404 is moved downward to approach the removable cup 108, cold brew coffee 1026 is filtered through the perforated surface 408 or openings 840, passing through a mesh or other liquid permeable material (409 or 841) to capture and remove coffee grounds 1024. Filtration disc 404 is lowered until the spindle head 407 is captured within the spindle head capture area 412 defined by the resilient members 414 whereby the coffee grounds 1024 are retained between the filtration disk and the removable cup 108. At this point, the cold brew coffee 1026 within the brew chamber 104 can be poured out and enjoyed by a user.

Figure 10E:
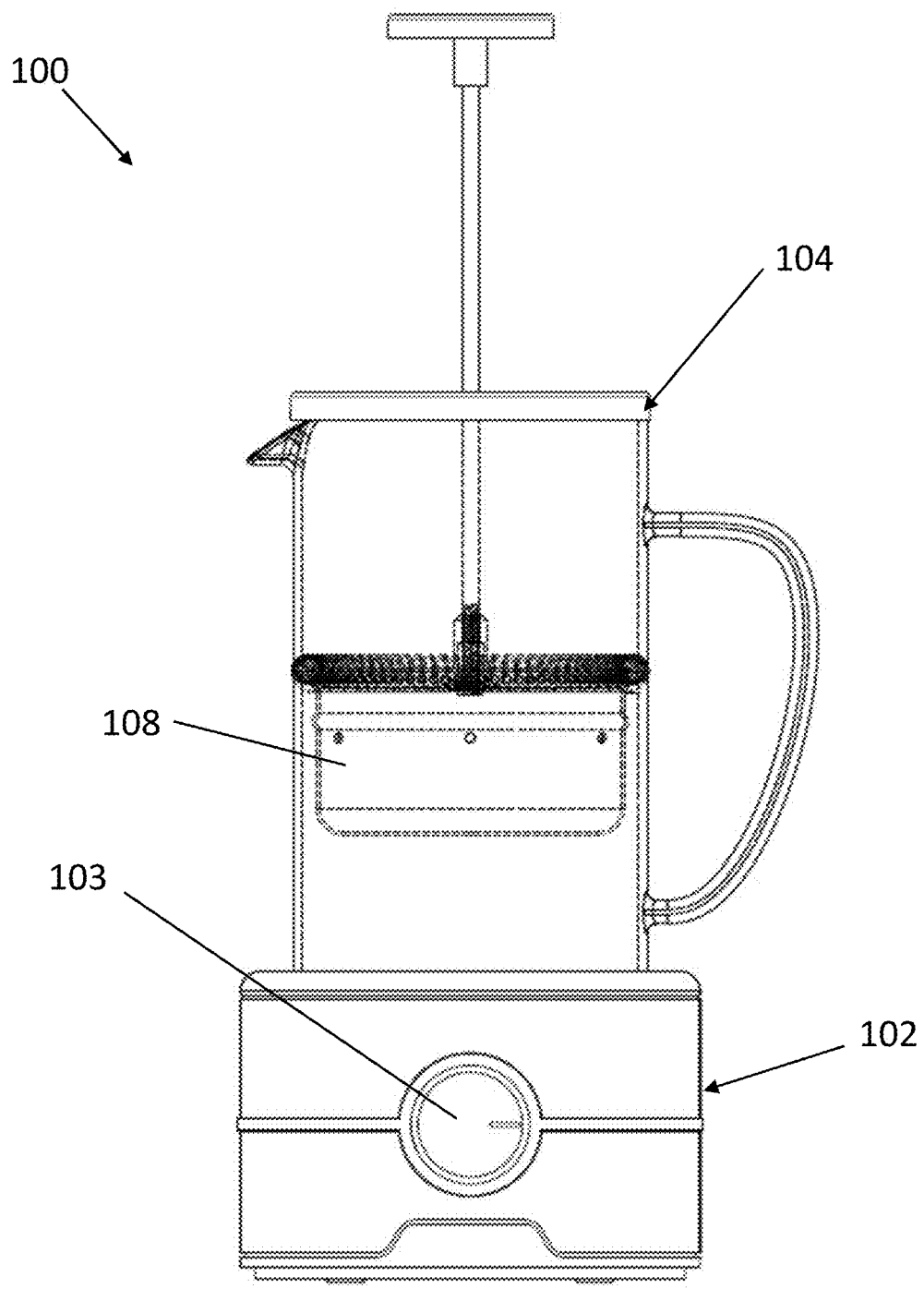

After the cold brew coffee 1026 has been poured from the brew chamber 104, the user can then withdraw the filtration assembly 400 from the brew chamber 104 by lifting the filtration handle 1030 such that the removable cup 108 is lifted via the spindle head 407 upward and out of the brew chamber 104. This is shown in FIG. 10E. As is illustrated in FIG. 4C, the spindle head 407 is captured by one or more resilient members 414 by pressure exerted against the spindle head. In certain exemplary embodiments, openings or other features can be formed in the resilient members to establish a better connection to the spindle head. Certain other exemplary embodiments may utilize more than the two resilient members illustrated. In this manner, the coffee grounds 1024 remain captured between the filtration disk 404 and removable cup 108 so as to facilitate disposal as well as subsequent cleaning of the brew chamber 104. Once the filtration disk 404 and removable cup 108 have been removed from the brew chamber 104, the spindle head 407 can be disconnected from the one or more resilient members 414 and the coffee grounds 1024 can be dumped out of the removable cup 108 for disposal.

Referring to FIG. 9, in certain exemplary embodiments, the spindle head 812 may comprise a capture lip 510. In such embodiments, the resilient member 842 are formed such that they engage with the capture lip 510 to establish a more secure connection than may be formed by the rounded spindle head 407 discussed previously. In such embodiments, the resilient members 842 may have to be moved laterally relative to the capture lip 510 in order to separate the filtration assembly 822 from the removable cup 802, a user may be encouraged to press on removal tabs 846. These removal tabs 846 are positioned such that the resilient members 842 are moved in an appropriate lateral direction such that the resilient members 842 move to release the spindle head 812.

Figure 11:
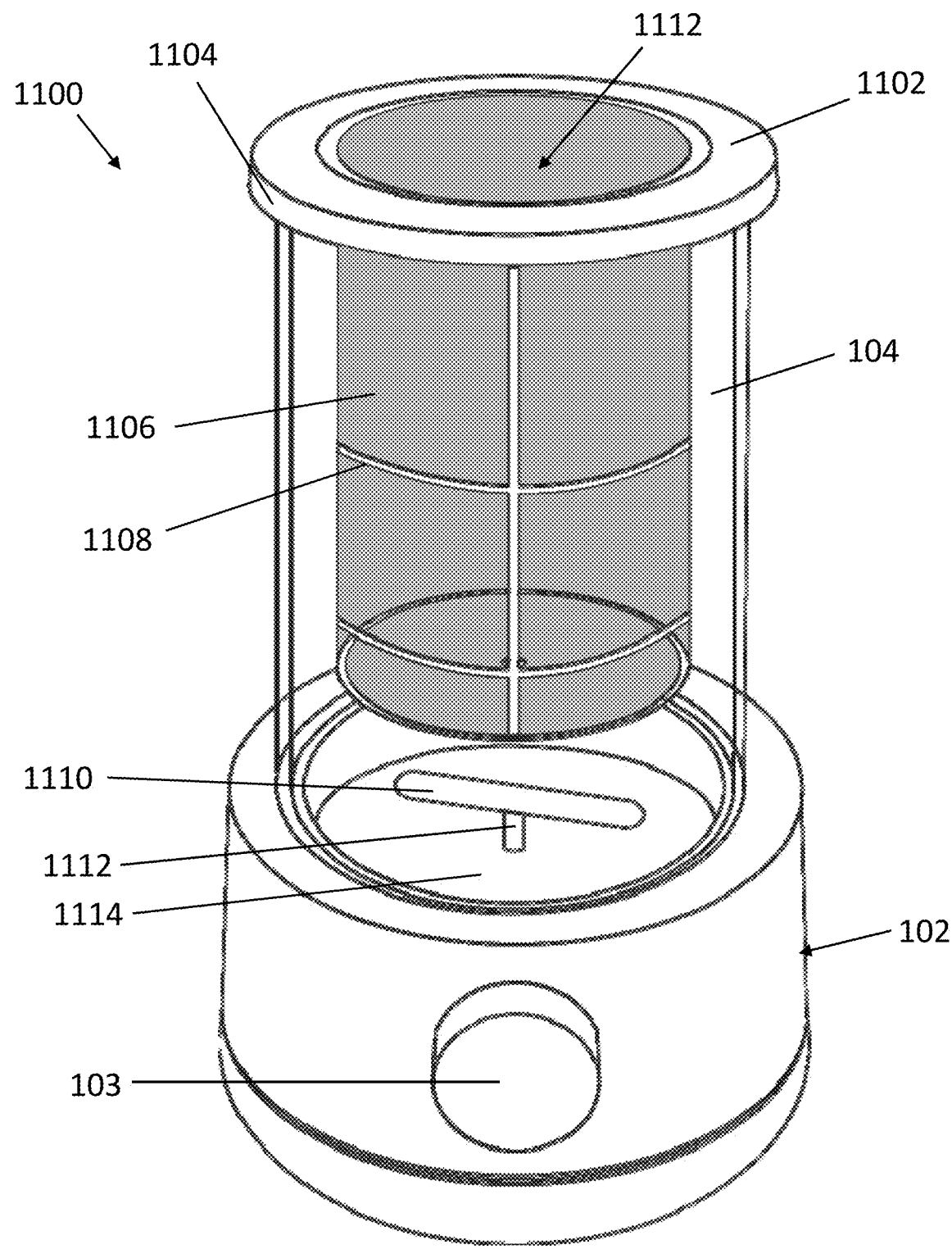
FIG. 11 is a cold brew coffee maker according to an exemplary embodiment.
Figure 12:
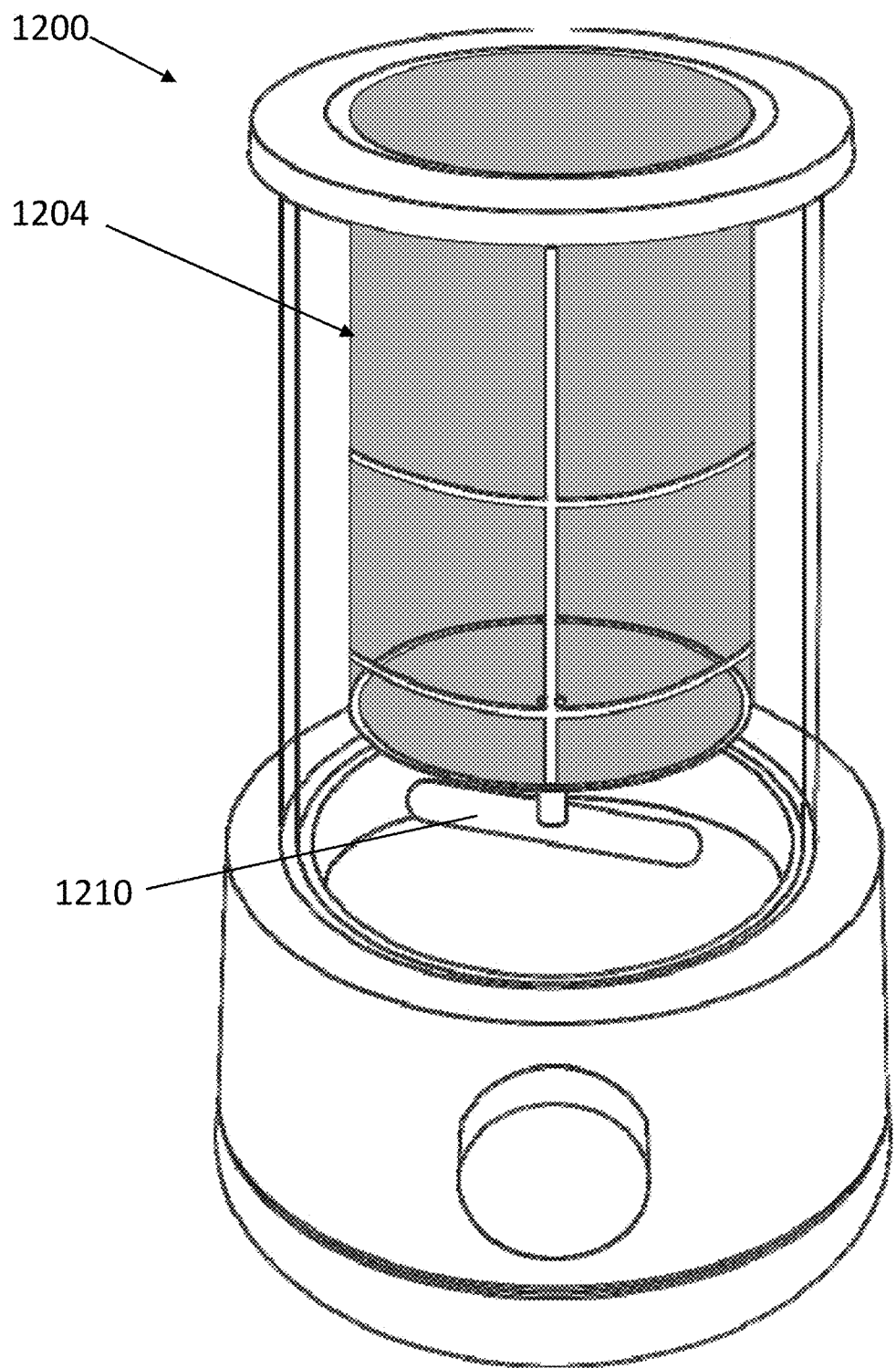
FIG. 12 is a cold brew coffee maker according to yet another exemplary embodiment.

The above exemplary embodiments utilize a removable cup (108 or 802) and filtration disk (404) to filter and capture the coffee grounds 1025 from the cold brew coffee 1026. However, the agitation of the liquid 1022 can be utilized to circulate the liquid through other filtration devices that can retain or otherwise capture the coffee grounds 1025 to prevent them from remaining in the cold brew coffee 1026 as it is served. As is illustrated in FIG. 11, in another exemplary embodiment of a cold brew coffee maker 1100, a filtration basket 1102 is placed into a brew chamber 104. In an exemplary embodiment, the filtration basket 1102 comprises a suspension ring 1104 that rests on an upper edge of the brew chamber 104, suspending the filtration basket 1102 within the brew chamber 104. The filtration basket 1102 includes a filter media 1106 held in a frame 1108 to form a cylinder shape. In a matter similar to that of the exemplary embodiment illustrated in FIGS. 10A-10E, a liquid 1022 is added to the brew chamber 104 through an opening 1112 located on an upper portion of the filtration basket 1102 and the control knob 103 is turned to the "on" position. This causes a rotation of the magnetic field created by the rotation base assembly 102, which causes the impeller 1110 to rotate on a spindle 1112 affixed to an impeller plate 1114. The result is an agitation of the liquid in the brew chamber 104, including inside of the filtration basket 1102. The various steps described in the description of FIGS. 10A-10C is performed except that instead of the use of a filtration assembly (400 or 822), the filtration basket 1102 is lifted out of the brew chamber 104. The result is that cold brew coffee 1026 remains in the brew chamber 104, while the coffee grounds 1025 are captured by the filtration basket 1102 for disposal. Another exemplary embodiment is illustrated in FIG. 12. This exemplary embodiment of a cold brew coffee maker 1200 is similar to that of FIG. 11 with the exception that the impeller 1210 is rotatably affixed to a lower portion of the filtration basket 1204 rather than an impeller plate 1114 as was the case in the exemplary embodiment of FIG. 11.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

Any implementation or embodiment disclosed herein can be combined with any other implementation or embodiment, and references to "an implementation," "some implementations," "one implementation," "an embodiment," "some embodiments," "certain embodiments," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation or embodiment can be combined with any other implementation or embodiment, inclusively or exclusively, in any manner consistent with the aspects and implementations disclosed herein.

Where technical features in the drawings, detailed description or any claim are followed by reference numbers, the reference numbers have been included to increase the intelligibility of the drawings, detailed description, and claims. Accordingly, neither the reference numbers nor their absence have any limiting effect on the scope of any claim elements.

Coupled elements can be electrically, magnetically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the Figures. The orientation of various elements may differ according to other exemplary embodiments, and that such variations are intended to be encompassed by the present disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

What is claimed is:

1. A device for brewing cold brew coffee comprising:
   a base assembly having a rotatable magnetic field;
   a cylindrical brew chamber having an internal diameter, an open upper portion and closed base portion;
   a removable cup with a diameter that is substantially that of the internal diameter of the brew chamber, the removable cup configured with a rotatable impeller, the impeller magnetically coupled to the rotatable magnetic field of the base assembly;
   a filter assembly adapted to be insertable into the brew chamber with a diameter substantially that of the internal diameter of the brew chamber; and
   the filter assembly comprising flexible components that grasp a portion of the removable cup.

2. The device of claim 1, further comprising a control that causes the magnetic field to rotate.

3. The device of claim 1, wherein the rotatable impeller rotates about a spindle, a first end of the spindle attached to a base of the removable cup and the second end of the spindle having a spindle head.

4. The device of claim 3, wherein the spindle head is configured with a shape that is adapted to be grasped by the flexible components of the filter assembly.

5. The device of claim 4, wherein the spindle head is cone shaped and configured with a capture lip that engages with the flexible components of the filter assembly such that the filter assembly can be used with withdraw the removable cup from the brew chamber.

6. The device of claim 1, wherein the removable cup comprises:
   wall sections that extend from a base plate to an upper rim;
   a locating means located adjacent to the upper rim; and
   a flexible material positioned at the locating means with a cross section such that the flexible material is in contact with the brew chamber along the inner diameter of the brew chamber when the removable cup is located in the brew chamber.

7. The device of claim 1, wherein the filter assembly comprises a filter disk with a filter media provided with openings sized to permit brewed coffee to flow through the openings but restrict the passage of coffee grounds.

8. The device of claim 7, wherein the filter assembly comprises a shaft with a first end affixed to a first side of the filter disk, the flexible components affixed to a second side of the filter disk.

9. The device of claim 8, wherein the filter assembly further comprises a cover having a central aperture, the cover located on the filter assembly such that the shaft passes through the central aperture, the cover sized to cover the open upper portion of the brew chamber, and a filtration handle affixed to a second end of the shaft portion.

10. A method for making cold brew coffee comprising:
    providing a base assembly comprising a rotatable magnetic field;
    providing a cylindrical brew chamber having an internal diameter, an open upper portion and closed base portion;

providing a filtration assembly;
providing a removable cup with a diameter that is substantially that of the internal diameter of the brew chamber;
inserting into the brew chamber, a rotatable impeller coupled to the rotatable magnetic field of the base assembly, the rotatable impeller affixed to the removable cup, such that the step of inserting the rotatable impeller into the brew chamber results in the removable cup also being inserted into the brew chamber;
introducing a liquid into the brew chamber;
causing the magnetic field of the base assembly to rotate resulting in the rotation of the impeller;
adding ground coffee to the liquid such that the impeller causes the liquid and the ground coffee to be mixed;
separating the ground coffee from the liquid by performing the steps of:
 inserting the filtration assembly into the open upper portion of the brew chamber;
 causing a portion of the filtration assembly to move from the open upper portion towards the closed base portion, the liquid passing through openings in the portion of the filtration assembly while the ground coffee is prevented from passing through the openings; and
dispensing the liquid.

11. The method of claim 10, wherein the portion of the filtration assembly moved from the open upper portion towards the closed base portion is a filter disk comprising a filter media configured with openings sized to permit brewed coffee to flow through the openings but restrict the passage of coffee grounds.

12. The method of claim 10, where the magnetic field of the base assembly causes the impeller to rotate about a spindle, a first end of the spindle being attached to a base of the removable cup and the second end of the spindle having a spindle head, the filtration assembly comprising flexible grasping components, the spindle head being configured with a shape that is adapted to be grasped by the flexible grasping components of the filter assembly, the method further comprising the steps of:
 moving the portion of the filtration assembly towards the closed base portion such that the flexible components of the filtration assembly contact and grasp the spindle head, causing the filtration assembly to be removably attached to the removable cup via the spindle head; and
 removing the filtration assembly and removable cup from the brew chamber.

13. The method of claim 12, wherein the spindle head is cone shaped and configured with a capture lip that engages with the flexible grasping components of the filter assembly.

14. The method of claim 10, wherein the rotatable impeller is affixed to a filter assembly.

15. The method of claim 10, wherein the filtration assembly further comprises a shaft and the step of causing a portion of the filtration assembly to move from the open upper portion towards the closed base portion is performed by pressing on the shaft.

16. The method of claim 12, wherein the removable cup comprises a wall section that extends from a base plate to an upper rim and the step of causing the filtration assembly to be removably attached to the removable cup results in substantially all of the ground coffee being captured between the removable cup and the portion of the filtration assembly.

17. A device for brewing cold brew coffee comprising:
a base assembly comprising a rotatable magnetic field, the base assembly further comprising a control that causes the magnetic field to rotate;
a cylindrical brew chamber having an internal diameter, an open upper portion and closed base portion;
a removable cup with a diameter that is substantially that of the internal diameter of the brew chamber, the removable cup comprising wall sections that extend from a base plate to an upper rim; the removable cup further comprising a locating means located adjacent to the upper rim, and a flexible material positioned at the locating means with a cross section such that the flexible material is in contact with the brew chamber along the inner diameter of the brew chamber when the removable cup is located in the brew chamber;
the removable cup configured with a rotatable impeller rotatable around a spindle, a first end of the spindle attached to a base of the removable cup and the second end of the spindle having a spindle head, the impeller magnetically coupled to the rotatable magnetic field of the base assembly;
a filtration assembly comprising a filter disk with a filter media configured with openings sized to permit brewed coffee to flow through the openings but restrict the passage of coffee grounds, the filtration assembly adapted to be insertable into the brew chamber with a diameter substantially that of the internal diameter of the brew chamber;
the filtration assembly comprising flexible components;
the spindle head configured with a shape that is adapted to be grasped by the flexible components of the filter assembly; and
a lid portion adapted to cover the open upper portion of the brew chamber, the lid portion having an aperture through which a rod affixed to the filtration assembly passes when the filtration assembly is inserted into the brew chamber.

* * * * *